Apr. 10, 1923.

Re. 15,577

J. S. NICHOLS

FIREPLACE HEATER

Original Filed Aug. 21, 1920 2 sheets-sheet 1

Inventor:

James S. Nichols,

By Byrnes, Townsend & Brickenstein,

Attorneys.

Apr. 10, 1923.

Re. 15,577

J. S. NICHOLS

FIREPLACE HEATER

Original Filed Aug. 21, 1920 2 sheets-sheet 2

Inventor:

James S. Nichols,

By Byrnes, Townsend & Brickenstein,

Attorneys.

Reissued Apr. 10, 1923. Re. 15,577

UNITED STATES PATENT OFFICE.

JAMES S. NICHOLS, OF ATLANTA, GEORGIA, ASSIGNOR TO NIC-HEATER CORPORATION, OF ATLANTA, GEORGIA, A CORPORATION OF GEORGIA.

FIREPLACE HEATER.

Original No. 1,370,349, dated March 1, 1921, Serial No. 405,042, filed August 21, 1920. Application for reissue filed March 1, 1923. Serial No. 622,209.

*To all whom it may concern:*

Be it known that I, JAMES S. NICHOLS, a citizen of the United States, residing at Atlanta, in the county of Fulton and State of Georgia, have invented new and useful Improvements in Fireplace Heaters, of which the following is a specification.

This invention relates to heating devices for rooms, apartments and the like and particularly to an open grate heater, and the primary object of the invention is to provide an open grate heater adapted to be readily arranged in open fireplaces of different types, and to have the essential elements of the improved heater so coordinated that the heater may be readily adapted to fireplaces of different structures without requiring a reorganization of the heater. A further object of the invention is to provide a novel structure of open fireplace heater which constitutes an improvement of the heating device of similar character disclosed in the Patent No. 1,370,349 granted to me on March 1, 1921, and in the improved heater the products of combustion are caused to circulate or pass therethrough to a smoke outlet or chimney from the open grate by way of a drum which extends inwardly an advantageous distance from the front of the fireplace to provide an extended heating surface for practically heating a room or compartment into which the drum may project with material economy in the use of fuel.

The present improved heater comprises a complete organization of grate and frame having a metal back sheathing adapted to be readily set in place in a fireplace opening and to which the drum may be removably applied and positively held by a simple operation and without requiring the services of skilled workmen to dispose the several parts of the heater in operative position. The invention also consists in the construction and arrangement of the several parts which will be more fully hereinafter described and claimed.

Figure 1:
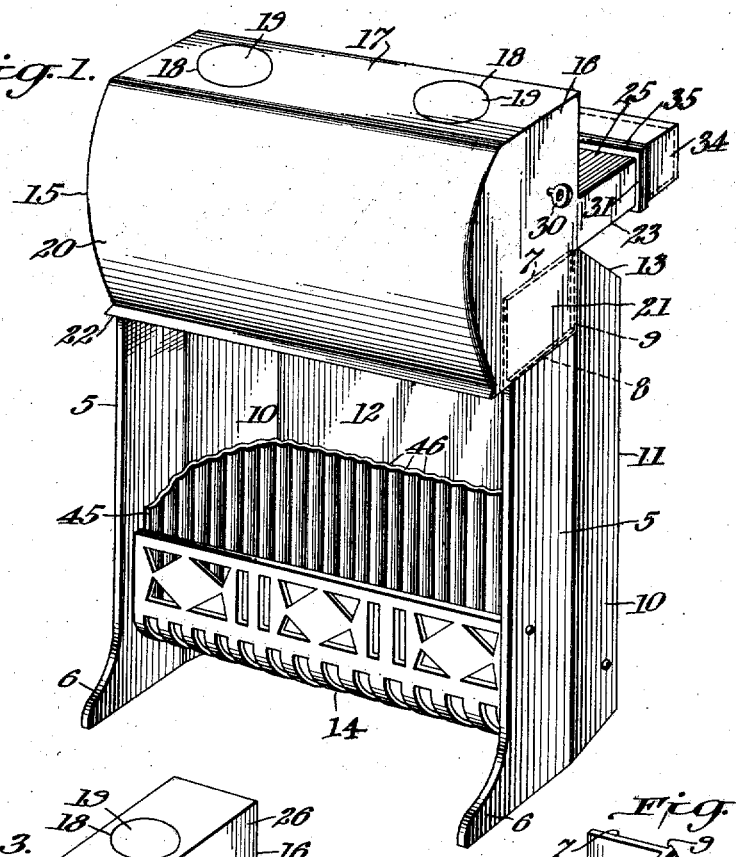
Figure 1 is a perspective view of the improved fireplace heater.
Figure 3:
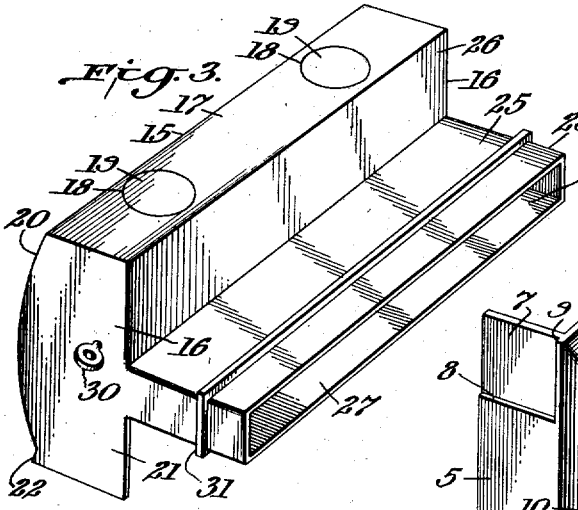
Fig. 3 is a perspective view of the removable drum.
Figure 2:
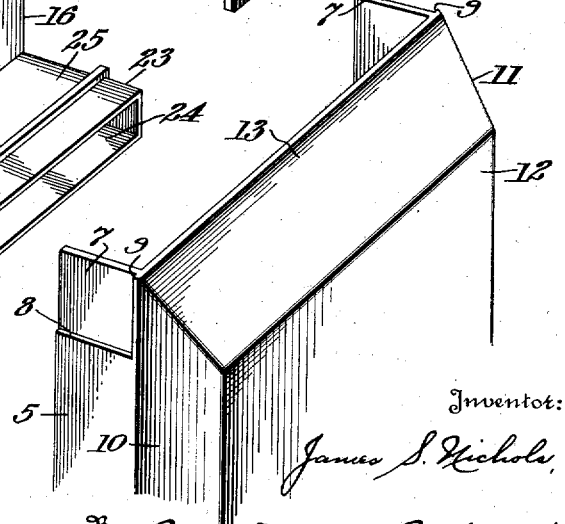
Fig. 2 is a similar view of a portion of the sides and back of the improved heater and particularly showing the formation of the upper and top portion thereof.

The improved heater as particularly shown by Figs. 1, 2, and 3 comprises opposite metal members or ends 5 having lower outward extensions or supporting feet 6 to rest on the floor of a fireplace, the upper extremities of the said ends 5 having recesses 7 to provide lower and rear shoulders 8 and 9 for a purpose which will be presently explained.

Figure 4:
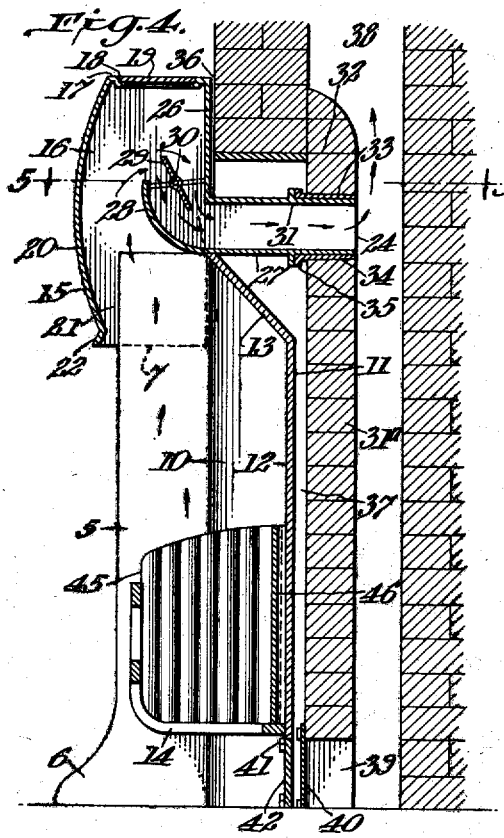
Fig. 4 is a transverse vertical section through a fireplace and a part of the adjacent wall and chimney flue showing one mode of mounting the improved heater therein.

The ends 5 are continued rearwardly in the form of end extensions 10 that also constitute the opposite ends of a rear inclosure 11 having a closed back wall or side 12 and an upper forwardly inclined top wall 13 terminating in rear of the upper terminals of the ends 5. The ends 5, extensions 10, the back wall or side 12 and the upwardly and forwardly inclined top wall 13 are preferably formed integral and of suitable cast metal. It will be understood, however, that in some structures it may be desirable to make the rear inclosure 11 separate from the ends 5 and secure the said inclosure to the rear edges of the ends by any well known means. It is preferred, however, that the ends 5 and the rear inclosure 11 be of integral structure so that all this part of the improved heater may be conveniently set in a fireplace. Suitably supported between the ends 5 and the extensions 10 is an open or basket grate 14 which is held at any suitable elevation at its bottom portion above the lower edges of the feet or supports 6. This grate continues rearwardly to the back wall or side 12 and is bolted or other wise fastened to the parts of the heater comprising the ends 5 and the said inclosure 11. This grate may be so secured to the ends 5 and the parts of the inclosure 11 that it may be removed in the event of burning out of the grate bars or for other reasons and replaced by a similar new grate. The remaining essential feature of the heater is a drum 15 which is removably fitted over the upper extremities of the ends 5 and in part projects rearwardly over the top inclined wall 13 of the inclosure 11. The drum 15 is preferably formed of sheet metal and comprises opposite ends 16 and a top 17 having openings 18 formed therein normally closed by plates or covers 19. The front wall 20 of the drum is outwardly bent in convex form fully from the front edge of the top 17 downwardly to the lower edges of depending side flanges 21 which are continuations of the ends 16. The lower edge portion of the front convex side 20 of the drum is flared outwardly as at 22 to give it a neat appearance and also facilitate the inflowing of the air into the front top portion of the heater. The drum 15 also has a rearwardly extending flue or outlet duct 23, the said flue or duct 23 being preferably of rectangular form and fully closed except at its rear outlet end 24. The closed top 25 of this duct intersects a rear closed wall 26 forming the back of the drum, and from the bottom of the flue or duct 23 downwardly to the lower edges of the flanges 21 the rear of the drum is fully open. The bottom 27 of the flue or duct 23 is continued forwardly and upwardly curved about centrally between the wall 26 and the convex front 20 of the drum, as shown by Fig. 4, to provide a separating partition 28 for the drum, the said partition causing the products of combustion to flow upwardly toward the top of the interior of the drum then downwardly in rear of the said partition into the flue 23 and from the latter pass off into the chimney, as will be hereinafter specified. Mounted in the rear portion of the drum between the upper terminal of the partition 28 and the rear wall 26 is a damper 29 having an operating rod 30 with a suitable gripping device located exteriorly at one end of the drum. The damper 29 is of such width that when it is closed the opposite side edges thereof will frictionally impinge against the opposing surfaces of the partition 28 and the rear wall 26, as shown by dotted lines in Fig. 4. The flue or duct 23 also has a stop rib 31 extending fully around the same at a suitable distance from the rear open end 24 thereof, said stop rib or flange 31 being adapted to limit the insertion of the flue in a supporting means therefor in one application of the heater. The drum 15 as hereinbefore indicated and clearly shown in the drawings is removably fitted over the upper extremities of the ends 5 with the flanges 21 fitting in the recesses 7 and engaging the shoulders 8 and 9 to provide a support for the drum and also adapt the drum to be regularly and positively applied. When the drum is applied as just explained, the upper edge of the inclined top wall 13 of the rear inclosure 11 is engaged by the lower wall 27 of the flue or duct 23, as shown by Fig. 4, and by this means the products of combustion pass up from the grate 14 and are deflected forwardly by the wall 13 and forced to pass up between the surfaces of the partition 28 and the front wall 20 of the drum and then downwardly around the partition into the flue or duct 23.

Figure 5:
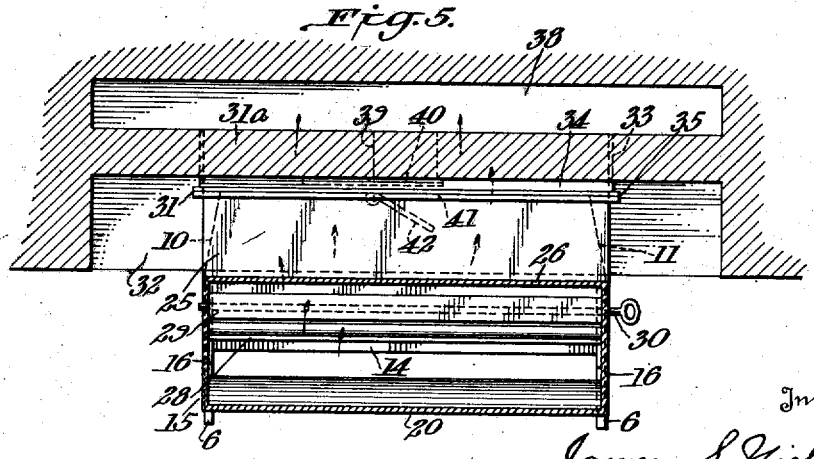
Fig. 5 is a horizontal section taken on the line 5—5, Fig. 4.

In the application of the improved heater as shown by Figs. 4 and 5 it is associated with a partition wall 31ª forming the back of the fireplace opening 32, and in the upper portion of the said partition wall 31ª an elongated opening 33 is constructed and provided with a metal lining or elongated thimble 34 which snugly fits in the said opening 33 and tapers or converges rearwardly. The thimble 34 acts as a reinforcing lining for the opening 33 and also as a support for the components of the wall or partition 31ª, and, further, as a means for tightly receiving the rear extremity of the flue or duct 23, the rib 31 of the flue or duct abutting against the front edge of the elongated thimble 34 when the flue or duct is inserted in the said thimble, the front edge of the said thimble being formed with an annular flange 35 against which the rib 31 has engagement. When the rib 31 is in contact with the flange 35 of the thimble 34 the flanges 21 depending from the ends or end walls 16 of the drum will have been fully fitted in the recesses, 7, and when the drum is so applied the rear wall 26 will stand away from the adjacent part of the wall over the top of the fireplace opening 32, as shown in Fig. 4, to form a narrow duct space 36 for circulation of air therethrough and whereby the upper rear part of the drum may be advantageously used to heat currents of air flowing through the said space 36. Furthermore, as shown by Figs. 4 and 5, the rear or back wall 12 of the inclosure 11 will stand in advance of the adjacent outer surface of the partition or wall 31ª and provide a rear duct 37, and as the front of the fireplace is fully open at opposite extremities of the improved heater and in view of the fact that the said heater is not as wide as the fireplace, air will be permitted to freely circulate through the duct 37 in rear of the wall or side 12 and become heated, thus further taking advantage of all possible heating surface that may be exposed for heating the air within a room and economizing in the use of fuel for heating purposes. At any time desired and found necessary the drum 15 may be withdrawn from the fireplace and the remaining part of the heater and quickly reset, as there are no fastening means between the flanges 21 and the upper extremities of the ends 5, nor between the flue or duct 23 and the thimble 24, the flue or duct having a frictional binding within the said thimble. The flue or duct 23 opens into the chimney flue 38 and the partition or wall 31[a] stands in advance of the rear wall of the chimney flue and has a lower opening 39 therein which is normally closed by a suitable slide door 40. Through the lower central part of the back wall or side 12 below the grate 14 an opening 41 is formed and is normally closed by a hinged door 42 of suitable construction. By opening the door 42 the slide 40 may be reached and opened to clear the opening 39 and permit a shovel or other device to be inserted therein and clean out all sediment or deposit in the bottom of the flue 38 in the rear of the partition or wall 31[a], and subsequently the slide or door 40 may be closed and also the door 42, and by this means the deposit may be taken from the base of the chimney flue without withdrawing the same through any part of the improved heater above.

Figure 6:
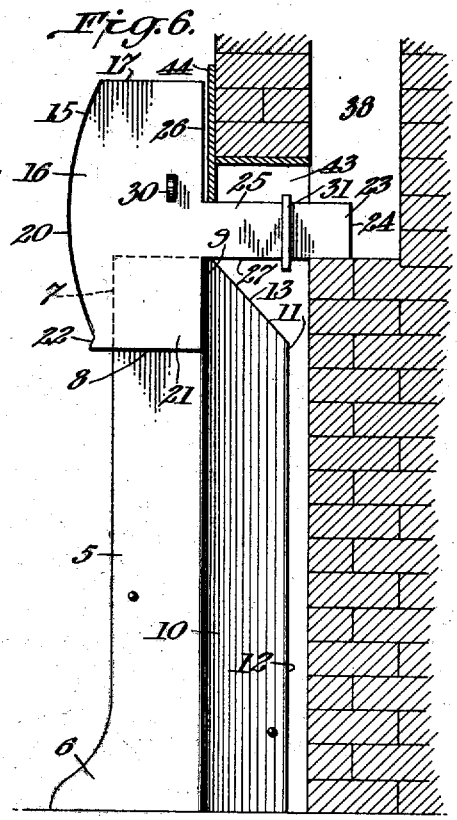
Fig. 6 is a view similar to Fig. 4 showing a different mode of mounting the improved heater in a fireplace.

The improved heater is shown applied in a different manner in Fig. 6, and in this instance the fireplace 43 is without the partition or wall 31[a], the chimney flue 38 opening directly into the top of the fireplace. Under these conditions the heater construction heretofore described and having similar reference characters applied thereto is set in the fireplace 43 and surrounded by a face strip 44 of metal which closes the front of the fireplace all around the heater, and under these conditions the flue or duct 23 projects directly into the chimney flue as shown. In this modified application of the heater the heating effect will be the same and the products of combustion will circulate upwardly through the drum and into the flue or duct 23 in the same manner as heretofore explained.

As an auxiliary feature to facilitate the heating of the currents of air drawn under the grate 14, an air heating lining sheet 45 is inserted in the grate and extends over the ends and also over a portion of the front side of the rear wall or back side 12 of the inclosure 11 of the heater, the said air heating lining sheet being vertically corrugated so as to form a plurality of ducts 46 relatively to the parts of the heater against which it is held, the vertical ducts 46 being open at the bottom of the grate, and by this means the lower air currents may flow upwardly through the said ducts 46 close to the fire and become thoroughly heated with further economy in the use of fuel and advantage in heating an apartment or room. The lining sheet 45 may be removed at any time desired and replaced by a new similar sheet, and it is proposed to construct the same of a material best adapted for the purpose such as metal or some fire-resisting plastic material.

The openings 18, by removing the covers 19, may be utilized for heating water or other substances.

The improved heating means generally is comparatively simple in its organization and the parts thereof may be readily disposed in a fireplace and assembled or dissociated for removal, and it is obvious that changes in the general dimensions and minor details of the several parts thereof may be adopted without departing from the scope of the invention.

I claim:

1. In a heating device of the class specified, the combination with an open fireplace having communication with a chimney flue, of a heater inset in the fireplace and consisting of side members and rear extensions and a back wall extending upwardly in connection with the side members and provided with an upwardly and forwardly inclined closed top extending over the extensions of the side members, a grate held fully between the side members and rear extensions, and a radiating drum open at the bottom to fit over the side members and extensions and to overhang the front edges of the side members, the drum being provided with a rearwardly extending flue for communicating with the chimney flue, the said drum being interiorly divided for a portion of its vertical extent by a forwardly projecting portion of the bottom of the flue and provided with a damper for controlling the outlet to the said drum flue.

2. In a heating device of the class specified, the combination with an open fireplace in communication with a chimney flue, of supporting side members having a rear inclosure provided with an upper forwardly and upwardly inclined closed top, a grate held against the rear inclosure and between the side supporting members, and a drum removably inserted above the upper ends of the side members and having a flue extending over and engaging the upper edge of the said inclosure top, the drum flue having communication with the chimney flue, the drum being open at the bottom and having a partition extending horizontally in line with the bottom of the flue and then upwardly into the drum to partially divide the drum and provide a passage opening into the drum flue.

3. In a heating device of the class specified, the combination of an open fireplace having a rear partition wall with an opening therethrough communicating with a chimney flue, of a heater disposed in the fireplace and comprising side member supports and a rear inclosure with an upper forwardly and upwardly inclined closed top terminating at its upper edge at the rear terminals of the upper ends of the said supports, a grate held between and within the member supports and a drum removably mounted over the upper ends of the supports and having a rearwardly extending flue fitted in the opening of the partition, the bottom of the flue engaging the upper front edge of the said closed top and the flue being fully open at the bottom over the supports to permit the products of combustion to circulate upwardly thereinto and then pass out through the flue thereof and into the chimney flue.

4. In a heating device of the class specified, the combination of an open fireplace having a rear partition wall with an opening therethrough communicating with a chimney flue, of a heater disposed in the fireplace and comprising side members and a rear inclosure with an upper forwardly and upwardly inclined closed top terminating at its upper edge at the rear terminals of the upper ends of the grate supporting side members, a grate supported by said side members and a drum removably mounted over the upper ends of the side members and having a rearwardly extending flue fitted in the opening of the partition, the bottom of the flue engaging the upper front edge of the said closed top and the flue being fully open at the bottom over the side members to permit the products of combustion to circulate upwardly thereinto and then pass out through the flue thereof and into the chimney flue, the lower central portion of the said fireplace partition and center of the back of the extension from the sides having openings therein provided with closing doors whereby sediment may be removed from the bottom of the chimney flue.

5. In a heating device of the class specified, the combination of an open fireplace having a rear partition wall with an opening therethrough communicating with a chimney flue, of a heater disposed in the fireplace and comprising side members and a rear inclosure with an upper forwardly and upwardly inclined closed top terminating at its upper edge at the rear terminals of the upper ends of the grate supporting side members, a grate supported by said members and a drum removably mounted over the upper ends of the side members and having a rearwardly extending flue fitted in the opening of the partition, the bottom of the flue engaging the upper front edge of the said closed top and the flue being fully open at the bottom over the side members to permit the products of combustion to circulate upwardly thereinto and then pass out through the flue thereof and into the chimney flue, the lower central portion of the said fireplace partition and center of the back of the extension from the sides having openings therein provided with closing doors whereby sediment may be removed from the bottom of the chimney flue, the back of the extension and the upper rear side of the drum being respectively spaced from the partition wall of the fireplace and the upper part of the wall surrounding the fireplace to form air heating passages.

6. In a heating device of the class specified, the combination of an open fireplace having a rear partition wall with an opening therethrough communicating with a chimney flue, a heater comprising side members and a rear inclosure having a forwardly and upwardly inclined closed top terminating at the rear of the top edges of the grate supporting side members and leaving an opening between the upper ends of said side members, a grate supported by said members, a drum removably applied over the upper ends of the side members and fully open at the bottom, the drum having a rearwardly extending horizontal flue engaging the upper edge of the said closed top and also provided with a surrounding rib, and a thimble mounted in the opening of the fireplace partition, the rear extremity of the drum flue being inserted in said thimble and limited in its rearward movement by the rib engaging the front edge of the thimble.

7. In a heating device of the class specified, the combination of an open fireplace having a partition wall with an opening therein communicating with a chimney flue, a heater disposed in the fireplace and comprising side members and a rear inclosure with an upwardly and forwardly inclined closed top terminating at the rear portions of the upper extremities of the said side members, a grate supported by said members, the upper ends of the grate supporting side members having recesses formed therein, and a drum open at the bottom and having closed ends with depending extension flanges fitted and held in the recesses of the said grate supporting side members also provided with a rearwardly extending horizontal closed flue engaging the upper edge of the said closed top and provided with a surrounding rib at a distance in advance of the rear open end of said flue, the opening in the fireplace partition having a thimble fitted therein which converges toward the rear end and adapted to receive the rear extremity of the drum flue and have the rib of the latter engage the front edge of the said thimble.

8. In a heating device of the class specified, the combination of an open fireplace having communication with a chimney flue, a heater disposed in the fireplace and comprising side members and a rear inclosure continuing from the said side members and provided with an upwardly and forwardly inclined closed top terminating in rear of the upper ends of the said side members, the side members being provided with recesses in their upper extremities, a grate supported by said side members and a drum with an open bottom fitted over the upper ends of the side members and having depending end flanges to fit in the said recesses and also provided with a rearwardly extending horizontal flue which engages the upper edge of the said closed top, the drum having an interior partition partially extending upwardly therethrough to direct the products of combustion upwardly thereinto and around and downwardly in rear of the partition into the drum flue.

9. In a heating device of the class described, a standard comprising a back wall and side walls, a grate supported on the standard between the said walls, a radiating drum open at the bottom to receive the products of combustion, and a flue connected to the drum, the flue having a flat bottom surface extending across and seated upon the back wall of the standard, and the drum having side walls and a front wall extending below the upper edge of the side walls of the standard, the drum and the flue forming a separate unit.

10. In a heating device of the class described, a standard comprising a back wall and side walls, a grate supported on the standard between the said walls, a radiating drum having a front wall and side walls and a rear wall terminating above the lower edge of the front and side walls, a flue having side walls forming extensions of the side walls of the drum, an upper wall extending from the lower edge of the said rear wall and a lower wall seated upon the upper edge of the back wall of the standard, the front wall and the side walls of the drum extending below the upper edge of the side walls of the standard.

11. In a heating device of the class described, a standard comprising a back wall and side walls, a grate supported on the standard between the said walls, a radiating drum open at the bottom to receive the products of combustion, and a flue connected to the drum, the drum having side walls and a front wall fitting over the upper portion of the standard and a rear wall terminating above the lower edges of the front and side walls, the side walls of the drum extending rearwardly to form side walls of the flue and the bottom wall of the flue defining a seat for the drum upon the upper edge of the back wall of the standard, and a partition wall within the drum extending upwardly from the bottom wall of the flue.

12. In a heating device of the class described, a standard comprising side walls, a back wall including at its top a forwardly and upwardly inclined portion, the upper edge of said portion being disposed in the plane of the upper edges of the side walls and rearwardly of the front edges thereof, a grate supported on the standard between the said walls, a radiating drum having side walls fitting over the upper portion of the side walls of the standard and a front wall overhanging the front edges thereof, and a flue extending across the upper edge of said inclined portion and seated thereon, the rear wall of the drum terminating at the upper surface of the flue and the drum and the flue forming an integral structure.

13. In a heating device of the class described, a standard comprising side walls, a back wall including at its top a forwardly and upwardly inclined portion, the upper edge of said portion being disposed in the plane of the upper edges of the side walls and rearwardly of the front edges thereof, a grate supported on the standard between the said walls, a radiating drum having side walls fitting over the upper portion of the side walls of the standard and a front wall overhanging the front edges thereof, a flue extending across the upper edge of said inclined portion and seated thereon and a partiton wall extending from the lower wall of the flue inwardly and úpwardly in the drum to points above the upper wall of the flue, the drum and the flue forming an integral structure.

14. In a heating device of the class described, a heating drum having a front wall, side walls, a top wall and a rear wall terminating intermediate the top wall and the lower edges of the front and side walls, and a flue substantially rectangular in cross-section the side walls of which lie substantially in the planes of said side walls and the bottom wall of which lies in a plane above the lower edges of the said front and side walls, the upper wall of the flue joining the said rear wall.

15. Device according to claim 14 including a partition wall extending inwardly and upwardly in the drum from the lower edge of the flue to points above the upper wall of the flue.

JAMES S. NICHOLS.